United States Patent [19]

Joseph et al.

[11] Patent Number: 5,195,218
[45] Date of Patent: Mar. 23, 1993

[54] FLEXIBLE CORD LOCK DEVICE

[75] Inventors: Mark Joseph, Aspen, Colo.; Kurt H. Lundstedt, Long Grove, Ill.

[73] Assignee: Illinois Tool Works Inc., Glenview, Ill.

[21] Appl. No.: 804,072

[22] Filed: Dec. 9, 1991

[51] Int. Cl.⁵ ............................................... F16G 11/00
[52] U.S. Cl. ..................... 24/129 R; 24/129 D; 24/130; 24/30.5 S
[58] Field of Search ............ 24/129 R, 129 A, 129 B, 24/129 C, 129 D, 129 W, 130, 16 R, 30.5 P, 30.5 S, 17 A, 17 AP, 49 S

[56] References Cited

U.S. PATENT DOCUMENTS

| | | | |
|---|---|---|---|
| 536,031 | 3/1895 | Hood | 24/130 |
| 1,034,741 | 8/1912 | Smith | 24/129 R |
| 2,460,963 | 2/1949 | Young | 24/30.5 S |
| 2,503,327 | 4/1950 | Fields | 24/130 |
| 2,783,515 | 3/1957 | Tobias | 24/129 D |
| 2,981,990 | 5/1961 | Balderree, Jr. | 24/30.5 S |
| 3,043,902 | 7/1962 | Klein | 24/129 D |
| 3,050,803 | 8/1962 | Hulterstrum | 24/129 R |
| 3,357,674 | 12/1967 | Coanda et al. | 24/130 |
| 4,222,157 | 9/1980 | Forman | 24/129 A |
| 4,901,402 | 2/1990 | Begemann | 24/129 D |

FOREIGN PATENT DOCUMENTS

| | | | |
|---|---|---|---|
| 0610033 | 12/1960 | Canada | 24/129 R |
| 1353431 | 1/1964 | France | 24/30.5 S |

*Primary Examiner*—Victor N. Sakran
*Attorney, Agent, or Firm*—Schwartz & Weinrieb

[57] ABSTRACT

A cord lock device for binding to a cord including a substantially flexible cord lock member having a predetermined length, width and thickness and first and second longitudinal ends and an aperture extending through the cord lock member proximate the first end of the cord lock member, the aperture having a predetermined configuration selected with respect to the cord lock member, the position of the aperture with respect to the first end of the cord lock member, the flexibility of the cord lock member and the particular dimensions and material of the cord so that after threading of a portion of the cord through the aperture, the aperture, the cord lock member and the cord cooperate to provide an engagement force between the cord lock member and the cord sufficient to restrict movement of the cord through the aperture.

25 Claims, 2 Drawing Sheets

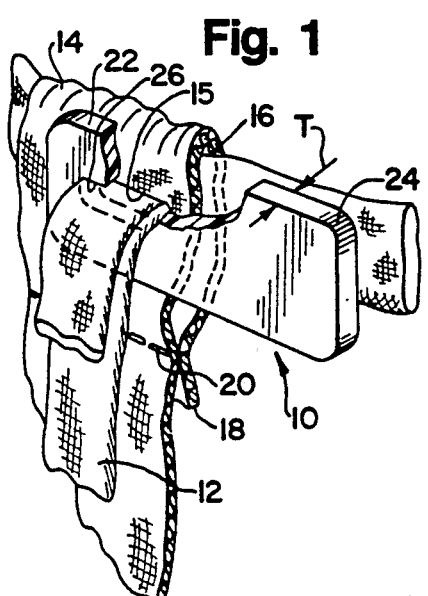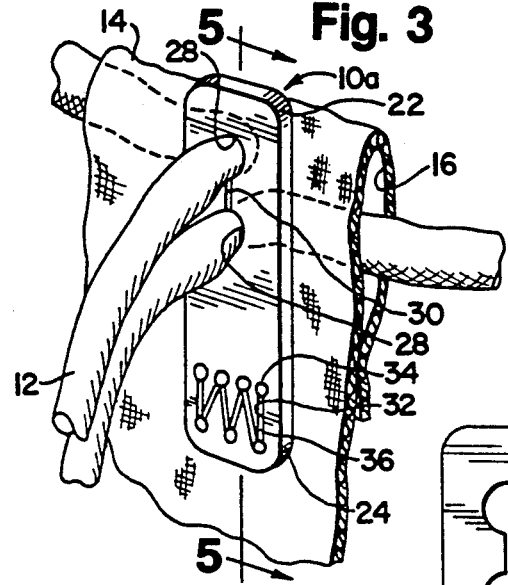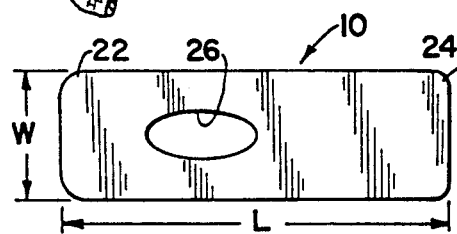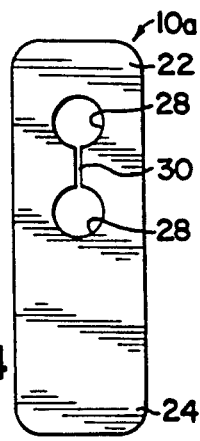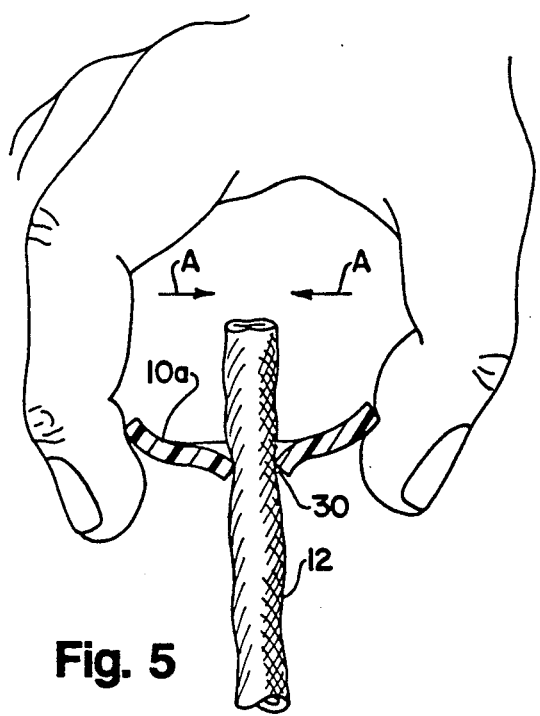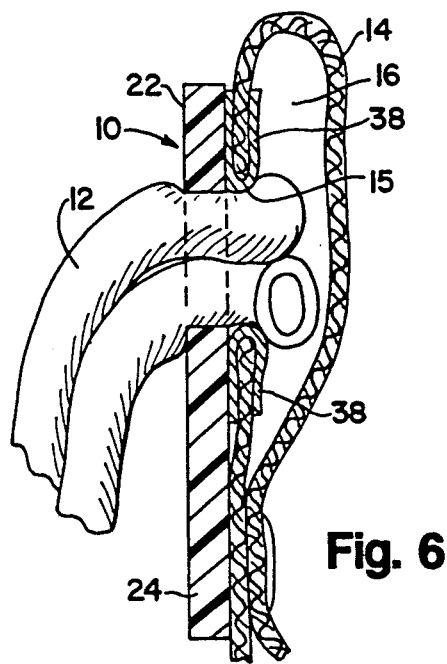

FLEXIBLE CORD LOCK DEVICE

BACKGROUND OF THE INVENTION

1. Field of the Invention

This invention relates generally to cord locks, and more particularly to a flexible cord lock for binding a cord thereto which readily is formed in a single piece, can be utilized with a variety of cord materials, shapes and sizes to restrict movement of the cord with respect to the cord lock and can be affixed to another article, such as a garment, to prevent misuse, theft or loss of the cord lock.

2. Description of the Related Art

Cord locks typically are utilized in conjunction with a cord to restrict movement of the cord with respect to the cord lock and/or another article. Although cord locks are useful in many applications, a common usage is with a cord such as the drawstring of a garment or the like. Such cords are threaded through an aperture and into a passageway formed in the garment hem about an opening in the garment, such as a sleeve end, the bottom edge or a hood of the garment. When the garment is worn by a user, the cord can be pulled tight to gather the garment about the wrist, torso or neck of the user to restrict drafts and the elements from entering the garment causing discomfort to the user. Thereafter, the cord can be loosened to allow air to enter the garment. Such drawstrings also are used with many camping and recreational items such as backpacks and the like.

Typically, to maintain the cord in the tightened position and prevent ungathering of the garment, the cord ends are tied together in a knot. Such tying can be inefficient or difficult, especially if positioned on the sleeve end since two hands usually are needed to tie the knot. Furthermore, small children typically are not capable of tying such knots.

Rather than tying the ends of the cords together, each end of the cord can be knotted or affixed with a stop member which restricts the cord ends from being drawn into the opening in the garment hem. Such stop members, however, typically do not maintain a fixed position along the length of the cord and/or are not adjustable.

Cord locks therefore have been employed to eliminate the tying of the cord ends and provide a fixed yet adjustable type of stop member. The basic type of cord lock typically includes two substantially concentric rigid cylindrical members where the inner cylindrical member is secured within, and spring loaded with respect to, the outer cylindrical member. Each cylindrical member includes a through-aperture where the apertures become aligned upon compression of the spring member. Once the apertures are aligned, one or more ends of the cord can be threaded through both of the apertures and the cord lock can be pulled along the cord to abut the garment. After the spring compression is released, misalignment of the apertures of the cylindrical members occurs, trapping the cord therebetween against the spring force. The abutment of the cord lock against the garment opening restricts loosening of the cord.

Such cord locks, however, require a three-piece design with one or more assembly steps, can be rendered ineffective or inoperative upon repeated use or rusting of a metallic spring member and readily can become detached from the cord end and lost. Detachment from the cord end is a serious problem when cord locks are utilized with children's clothing since they readily can be removed and swallowed.

It therefore is desirable to provide a one-piece cord lock which easily can be manufactured without any assembly at a minimum cost, can engage a variety of cord materials, shapes and sizes and can be affixed directly to another article, such as a garment, to prevent loss of the cord lock from the cord.

SUMMARY OF THE INVENTION

The invention provides a cord lock device for binding to a cord including a substantially flexible cord lock member having a predetermined length, width and thickness and first and second longitudinal ends. An aperture extends through the cord lock member proximate the first end of the cord lock member where the aperture has a predetermined configuration selected with respect to the cord lock member, the position of the aperture with respect to the first end of the cord lock member, the flexibility of the cord lock member and the particular dimensions and material of the cord so that after threading of a portion of the cord through the aperture, the aperture, the cord lock member and the cord cooperate to provide an engagement force between the cord lock member and the cord sufficient to restrict movement of the cord through the aperture.

BRIEF DESCRIPTION OF THE DRAWINGS

Various objects, features, and attendant of the present invention will become more fully appreciated from the following detailed description, when considered in connected with the accompanying drawings in which like reference characters designate like or corresponding parts throughout the several views, and wherein:

FIG. 1 is a perspective view in partial section of a cord lock device of the invention illustrated with a flat cord threaded through an aperture in the device and positioned proximate a garment hem through which the cord is threaded;

FIG. 2 is an elevational view of the cord lock device of FIG. 1;

FIG. 3 is a perspective view of a cord lock device, similar to FIG. I, but rotated 90 degrees and illustrating a round cord and another embodiment of the invention;

FIG. 4 is an elevational view of the cord lock device of FIG. 3;

FIG. 5 is an enlarged latitudinal sectional view of the cord lock device taken along the line 5—5 of FIG. 3 in the direction indicated generally, illustrating the operation of the cord lock device with the cord;

FIG. 6 is an enlarged longitudinal sectional view of a cord lock device illustrating an operation of the cord lock device providing increased binding force;

DESCRIPTION OF THE PREFERRED EMBODIMENTS

Figure 7:
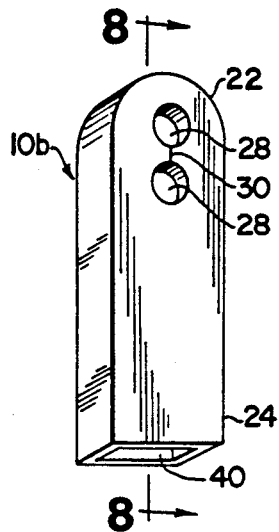
FIG. 7 is a perspective view of a cord lock device of another embodiment of the invention.

Referring to FIGS. 1 and 2, the cord lock device of the invention is designated generally by the reference numeral 10. The cord lock 10 typically is utilized to bind a cord or drawstring 12 of a garment or material 14 and restrict movement of the cord 12 with respect to the cord lock 10 and/or the garment 14 as will be described in detail below.

The cord 12 is illustrated in FIGS. 1 and 2 as a flat cord while the remaining drawings illustrate the cord 12 as being round. The cord 12 can be made from a variety or blend of materials as a solid, hollow or braided type of cord as well as from a resilient material, such as elastic, which is referred to as a "shock cord". The particular material, size and shape of the cord 12 can vary, so long as it cooperates with the cord lock 10 as described below. Typically, when used as a drawstring, the cord 12 is less than 0.50 inches (12.7 mm) but can be larger depending upon the particular application. Additionally, although the drawings indicate two pieces of the cord 12 in use with the cord lock 10, one piece of cord 12 also can be utilized with the cord lock 10, if desired.

The garment 14 normally is an article of clothing such as a jacket or coat, but also could be a camping or recreational article such as a backpack. It is to be understood, however, that the cord lock 10 can be utilized with any type of cord 12 with or without a garment 14. When the cord 12 is used with the garment 14, the cord 12 usually is threaded through an aperture 15 and into a passageway 16 formed in the garment 14.

As FIG. 1 illustrates, the passageway 16 typically is formed as part of the hem by folding over an edge 18 of the garment 14 and then securing the edge 18 to another portion of the garment 14 such as with stitches 20. In use, the cord 12 is pulled to gather or tighten the garment 14 about a portion of the body of a user, such as an arm, neck or torso. Thereafter, the cord lock 10 is utilized as described below to maintain the cord 12 in the tightened position and prevent drafts, rain or the like from entering the interior side of the garment 14 and causing cold and discomfort to the garment wearer.

When utilized with a backpack and similar camping or recreational articles, the cord 10 normally gathers the fabric of those articles about an opening therein to prevent items from falling out of the article and restrict the elements from entering into the interior of the article. The cord lock 10 is not restricted to use with such garments or recreational articles and can be utilized with a cord in a multitude of applications.

As FIGS. 1 and 2 illustrate, the cord lock 10 preferably is formed as a single piece from a flexible plastic material having a generally rectangular configuration with a predetermined length L, width W and thickness T. Preferably, the length is selected to be less than 2.5 inches (63.5 mm), the width less than 1 inch (25.4 mm) and the thickness less than 0.50 inches (12.7 mm). The particular material, dimensions and shape of the cord lock 10, however, can vary. Preferably, if the cord lock 10 is to be used with a garment 14, the material of the cord lock 10 should be selected to enable proper operation yet be washable and dryable in conventional washing and drying machines.

The cord lock 10 includes a first end 22, a second end 24 and an aperture 26 therethrough, positioned proximate the first end 22, but spaced a predetermined distance therefrom. In the embodiment of FIGS. 1 and 2, the aperture 26 has an oval type configuration with dimensions selected to cooperate with the dimensions of the cord 12 to be inserted therethrough. Preferably, the longitudinal axis of the oval aperture 26 is less than 0.33 inches (8.33 mm) with the lateral axis being selected to be less than the lateral axis to provide the desired oval configuration.

Although the cord lock 10 can be utilized without being fastened to the garment 14, the second end 24 can be secured to the garment 14 such as by a fastener, an adhesive, stitching or any similar manner.

The cord lock 10a of the embodiment of FIGS. 3 and 4 substantially is identical to the cord lock 10 of the embodiment of FIGS. 1 and 2 except for the orientation of the cord lock 10a being rotated 90 degrees with respect to cord lock 10 and the cord 12, the aperture 26 and the second end 24. In the embodiment of FIGS. 3 and 4, the aperture 26 is replaced with two substantially identical apertures 28 spaced a predetermined distance from each other and interconnected by a slit 30 formed through the cord lock 10.

The slit 30 is illustrated in FIG. 4 as having a slight width, but preferably this width is as small as possible and can be a clean cut which is limited to the width of the tool which forms or cuts the slit 30. Additionally, the apertures 28 and slit 30 can be formed with sharp corners to assist with the gripping of the cord 12.

Preferably, the apertures 28 are finished to a diameter of 1/16 of an inch (0.0625 in., 1.58 mm) and have centers spaced apart a distance of 5/32 of an inch (0.156 in., 3.97 mm) with the outermost aperture 28 being positioned 3/16 of an inch (0.187 in., 4.76 mm) from the first end 22 of the cord lock 10a. Depending upon the material of the cord lock 10a and the manufacturing process utilized to form the apertures 28, the dimensions of the apertures 28 may be adjusted before forming to compensate for expansion or shrinkage of the material in order to provide the desired finished dimensions.

It is to be noted that the particular dimensions of the cord lock 10a, the apertures 26 or 28, the cord 10, the positions of the apertures 26 or 28 with respect to the first end 22 of the cord lock 10a and the material of the cord lock 10a all are selected to provide the desired binding as described below. For example, the apertures 28 and slit 30 can be formed in the shape of the letter "I", a figure "8", a cross or "t" or merely a single, plain slit. Accordingly, due to the interdependence of these factors, variations can occur with any of the specific dimensions provided herein so long as the cord lock 10 or 10a functions as described.

As FIG. 3 illustrates, to secure the cord lock 10a to the garment 14, the second end 24 can include recesses or scores 32 and apertures 36 forming a guide for stitching 36. To reduce assembly time and costs, the stitches 36 can be the same as stitches 20 which form the hem of the garment 14.

Alternatively, as FIG. 4 illustrates, the scores 32 and apertures 34 can be eliminated, similar to the cord lock 10 of FIGS. 1 and 2. It is to be noted, however, that due to the material of the cord lock 10 or 10a, a sewing needle (not illustrated) readily can pierce the cord lock 10 or 10a for sewing without the apertures 36.

Briefly, the operation of the cord lock 10a will be described with reference to FIGS. 3-5, although the cord lock 10 as well as the cord locks illustrated in the embodiments of FIGS. 6-13 operate in substantially the same manner. After the cord 12 is threaded through the apertures 28 and slit 30, as illustrated in FIG. 3, the dimensions and flexibility of the material forming the cord lock 10, the dimensions of the apertures 28, slit 30 and the cord 12 as well as the position of the apertures 28 and slit 30 with respect to the first end 22 of the cord lock 10a cooperate to provide an engagement force to bind and restrict movement of the cord 12 with respect to the cord lock 10a in either direction. The restriction is sufficient to prevent tightening or loosening of the cord 12 under normal circumstances.

Although FIG. 3 illustrates two pieces of the cord 12 seated within the apertures 28, either piece or a portion of cord 12 can be positioned within the slit 30. Additionally, the engagement force can compress the cord 12 and slightly deform the edges of the apertures 28, tending to "flare" those edges in one direction or another.

To release the grip of the cord lock 10a, the first end 22 of the cord lock 10a is compressed in the direction of arrow "A" in FIG. 5. Such compression causes the cord lock 10a, proximate the apertures 28 and slit 30, to bulge, funnel or mushroom axially outward in one direction, such as downward in FIG. 5. This bulging causes the apertures 28 and slit 30 to axially "open up" in the direction of the bulge which significantly reduces the gripping of the cord 12 in the direction of the bulge. It is to be noted that due to the configuration of the cord lock 10a, the apertures 28, slit 30 and the compressive force applied, the cord 12 still is significantly restricted from movement in the direction opposite to the direction of the bulging of the cord lock 10a, which would be upward with respect to FIG. 5.

Thus, during compression the length of the cord 12 can be moved through the cord lock 10a to tighten or loosen the hem of the garment 14 depending on the direction of bulge of the cord lock 10a and its position with respect to the cord 12 and aperture 15 of the garment 14. It is to be noted that the size of the cord lock 10a prevents it from entering the aperture 15 so that the cord lock 10a can abut the exterior of the garment 14 to prevent movement of the cord 12 within the channel 16.

In practice, the particular dimensions required typically are obtained on a trial and error basis, although a quantitative analysis is possible. Additionally, when the cord 12 is a "shock cord" as described above, the cooperation between the cord lock 10 or 10a and the elasticity of the shock cord can provide easier adjustment, preferably with one hand, since the shock cord tends to flex and reduce its diameter as it is pulled and passes through the apertures 26 or 28. Thus, bulging of the cord lock 10 is not necessary. When the shock cord is released, it springs back to be retained by the cord lock 10 which can provide increased gripping due to the elasticity and "bunching" of the material on either or both sides of the cord lock 10.

FIG. 6 illustrates an application of the cord lock 10 or 10a for increased gripping or engagement force. In FIG. 6, the edge of the aperture 15 of the garment 14 is reinforced with a grommet 38. Thus, the grommet 38 preferably is substantially rigid and acts as a backup to prevent bulging of the cord lock 10 on the side of the cord lock 10 facing the grommet 38, which would be to the right with respect to FIG. 6. This in turn restricts movement of the cord 12 to the right which would cause the cord 12 and the garment 14 to loosen. In the position illustrated in FIG. 6, the left side of the cord lock 10 still can be bulged outward to enable tightening of the cord 12 and garment 14.

In order to loosen the cord 12 and garment 14, the cord lock 10 is pulled away from the grommet 38 a small distance to enable bulging in the direction of the grommet 38 and corresponding movement of the cord 12 in that direction. When the cord lock 10 is pulled away from the grommet 38, it may be slid along the cord 12 with or without bulging or the cord 12 merely can be tightened a small amount. To secure the cord lock to the garment 14, the second end 24 can be stitched to the garment 14 if desired (not illustrated.)

Figure 8:
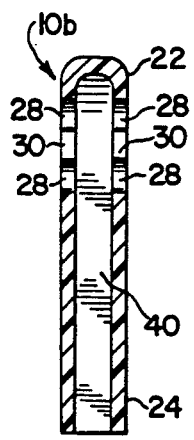
FIG. 8 is a longitudinal sectional view of the cord lock device taken along the line 8—8 of FIG. 7 in the direction indicated generally.

FIGS. 7 and 8 illustrate another embodiment of the cord lock device 10b where common elements are referred to by the same reference numerals. In this embodiment, the cord lock 10b is designed to be tubular having an internal cavity 40 which can be open on its second end 24 as illustrated or closed (not illustrated.) Thus, as FIG. 8 illustrates, four apertures 28 and two slits 30 are provided. It is to be noted that the operation of the cord lock 10b is substantially similar to that of the cord locks of the embodiments of FIGS. 1-6. The cord lock 10b can provide somewhat increased gripping of the cord 12 without the opposite sides of the channel 40 inhibiting operation of the cord lock 10b. FIGS. 9-13 illustrate another embodiment of the cord lock device 10c where common elements are referred to by the same reference numerals. In this embodiment, the cord lock 10c is non-tubular as in the embodiments of FIGS. 1-6, is tapered from the wider first end 22a toward the narrower second end 24a, includes another aperture 42 proximate the second end 24a and has specific detailing as will be described below. The aperture 42 preferably is sufficiently large to accept one or both pieces of the cord 12 without binding thereto and can vary in size and shape.

Figure 12:
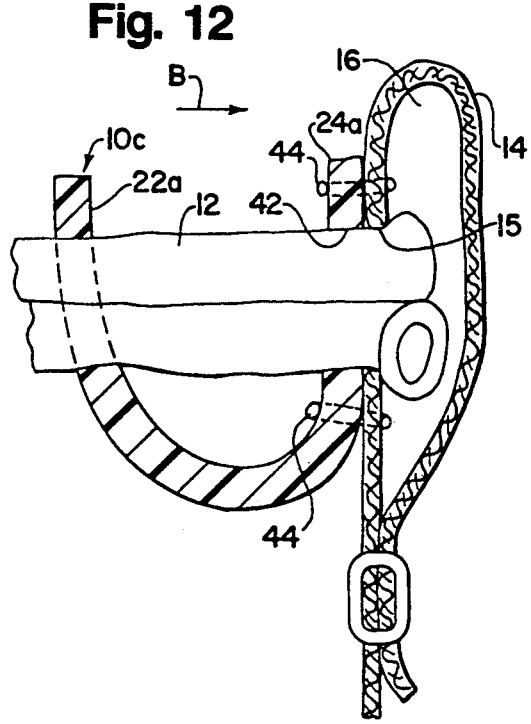
FIG. 12 is a longitudinal sectional view illustrating a folded, at-rest position of the device of FIG. 9 when connected to a garment.

The operation of the cord lock 10c substantially is the same as in the embodiments of FIGS. 1-8. In this embodiment, however, as FIGS. 12 and 13 illustrate, the aperture 42 of the second end 24a preferably is positioned over the aperture 15 of the garment 14 and the second end 24a is secured to the garment 14 in one or more areas, such as with stitches 44.

This securement not only prevents removal and loss of the cord lock 10c, but also serves to increase the gripping strength of the cord lock 10c, similar to that provided by the grommet 38 of FIG. 6. Thus, when the cord lock 10c is in its at-rest position illustrated in FIG. 12, the cord 12 is restricted within the apertures 28 and slit 30 as previously described.

Due to the flexibility of cord lock 10c, a small spring force is provided to position the first end 22a along the cord 12 a slight distance away from the second end 24a. In this position, a compressive force can be applied to the first end 22a to bulge the cord lock 10c in either direction to tighten or loosen the cord 12 as desired. The cord lock 10c maintains the cord 12 substantially in the position illustrated in FIG. 12.

Figure 13:
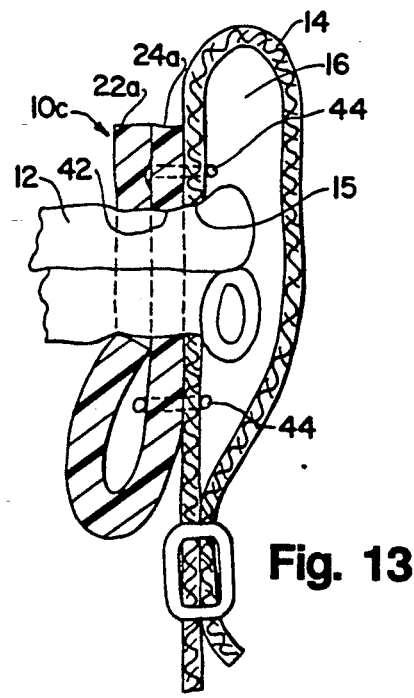
FIG. 13 is a longitudinal sectional view, similar to FIG. 12, illustrating operation of the cord lock device providing increased binding force.

When an attempt is made to loosen the cord 12, such as by pulling the hem outward which can occur during normal use, the first end 22a is moved in the direction of arrow "B" against the slight spring force provided by the material of the cord lock 10c to a position against the second end 24a as illustrated in FIG. 13. The second end 24a restricts bulging in the direction of arrow "B," similar to the grommet 38 of FIG. 6, and loosening of the cord 12 and garment 14.

It is to be noted that the cord 12 and garment 14 are slightly loosened an amount corresponding to the width of the gap between the first and second ends 22a and 24a when the cord lock 10c is in its at-rest position of FIG. 12. Additionally, the cord lock 10c can be utilized without being attached to the garment 14 and without the aperture 42 being aligned with the aperture 15 of the garment 14, in which case the cord lock 10c functions as described in the previous embodiments with or without the grommet 38.

Figure 9:
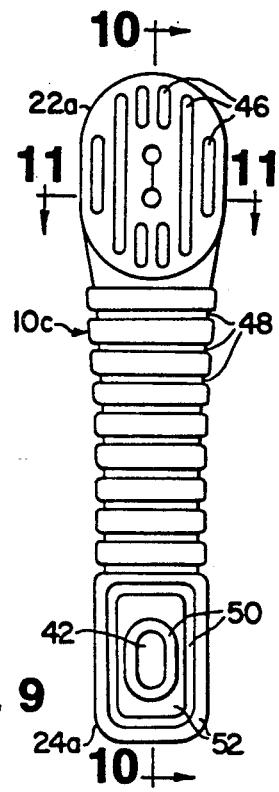
FIG. 9 is an elevational view of a cord lock device of another embodiment of the invention.
Figure 10:
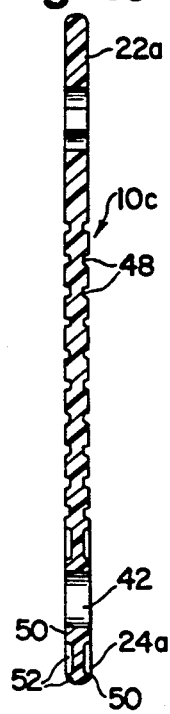
FIG. 10 is a longitudinal sectional view of the cord lock device taken along the line 10—10 of FIG. 9 in the direction indicated generally.
Figure 11:
FIG. 11 is a lateral sectional view of the cord lock device taken along the line 11—11 of FIG. 9 in the direction indicated generally.

As FIGS. 9-11 illustrate, the first end 22a is provided with recesses 46 which can assist in bulging and can provide a desired appearance. Recesses 48 also can be provided along the length of the cord lock 10c to assist in bending and for aesthetics. Additionally, the second end 24a can include ribs 50 formed between recesses 52 to reinforce the second end 24a and provide a desired appearance.

Modifications and variations of the present invention are possible in light of the above teachings. It is therefore to be understood that within the scope of the appended claims the invention may be practiced otherwise than as specifically claimed.

What is claimed and desired to be secured by Letters Patent of the United States is:

1. A cord lock device for binding a cord, comprising:
   a substantially flexible, planar cord lock member having a predetermined width, length, and thickness, first and second longitudinal ends, and longitudinally extending sides connecting said first and second longitudinal ends;
   first aperture means defined within said substantially flexible, planar cord lock member for permitting a cord to extend therethrough; and
   second longitudinally extending aperture means connected to said first aperture means and including longitudinally extending side edge portions extending longitudinally between said longitudinally extending sides of said substantially flexible, planar cord lock member so as to define along with said first aperture means a releasable locking means for lockingly engaging said cord extending through said first aperture means as a result of said longitudinally extending side edge portions of said second aperture means being disposed in a contracted state when said substantially flexible, planar cord lock member is disposed in a first, normal, non-compressed state, and for releasing said cord extending through said first aperture means as a result of said longitudinally extending side portions of said second aperture means being disposed in an expanded state wherein said longitudinally extending side edge portions of said second aperture means protrude outwardly from the plane of said substantially flexible, planar cord lock member in a predetermined selective direction, when said substantially flexible, planar cord lock member is disposed in a second compressed state as a result of being laterally compressed transversely with respect to said longitudinally extending sides thereof, so as to permit said cord to be selectively tightened or loosened.

2. The cord lock device as defined in claim 1 wherein the material of said cord lock member is selected to provide said flexibility and binding, and said cord lock member can be affixed directly to a member housing the cord to prevent loss of said cord lock member without inhibiting the operation of said cord lock member.

3. The cord lock device as set forth in claim 2, wherein:
   said member comprises a garment.

4. The cord lock device as defined in claim 1 wherein said second aperture means has a substantially oval configuration.

5. The cord lock device as defined in claim 1, wherein:
   said cord lock member includes a third aperture means defined therethrough and positioned proximate said first aperture means, and said second aperture means comprises a slit interconnecting said third aperture means and said first aperture means, said first aperture means, said third aperture means, and said slit being formed such that axes thereof are disposed substantially perpendicular to the longitudinal axis of said cord lock member.

6. The cord lock device as set forth in claim 5, wherein:
   said first and third aperture means have substantially circular configurations.

7. The cord lock device as set forth in claim 5, wherein:
   said cord lock device comprises a second, substantially flexible, planar cord lock member spaced from but interconnected to said substantially flexible, planar cord lock member so as to define therewith a cord lock device having a substantially tubular configuration, said second, substantially flexible, planar cord lock member having first, second, and third aperture means similar to and co-axially aligned with said first, second, and third aperture means of said substantially flexible, planar cord lock member.

8. The cord lock device as defined in claim 1 including engagement means for increasing the engagement force and restriction of said cord through said first aperture means.

9. The cord lock device as set forth in claim 8, wherein:
   said engagement means comprises a grommet.

10. The cord lock device as defined in claim 8 wherein said engagement means are formed as a portion of said second end of said cord lock member.

11. The cord lock as set forth in claim 10, wherein:
    said cord lock member further comprises a plurality of recess means axially spaced along the longitudinal length of said cord lock member for permitting said cord lock member to be bent upon itself so as to have a substantially U-shaped configuration whereby said cord can extend through both said first aperture means disposed within said first end of said cord lock member and said engagement means disposed within said second end of said cord lock member.

12. The cord lock deice as defined in claim 8 wherein said engagement means can be connected to a member to be utilized with said cord lock device.

13. The cord lock device as set forth in claim 12, wherein:
    said member comprises a garment.

14. A cord lock device for binding to a cord, comprising:
    a substantially flexible, planar cord lock member having a predetermined length, width, and thickness, first and second longitudinal ends, and longitudinally extending sides connecting said first and second longitudinal ends;

first aperture means extending through said cord lock member proximate said first end of said cord lock member; and second longitudinally extending aperture means extending through said cord lock member and having a predetermined configuration selected with respect to said cord lock member the position of said second aperture means with respect to said first aperture means and said first end of said cord lock member, the flexibility of said cord lock member, and the particular dimensions and material of said cord so that after threading of a portion of said cord through said first aperture means, said first aperture means, said second aperture means, said cord lock member, and said cord cooperate with each other so as to provide an engagement force between said cord lock member and said cord which is sufficient to restrict movement of said cord through said first aperture means, said second longitudinally extending aperture means being connected to said first aperture means and including longitudinal extending side edge portions extending longitudinally between said longitudinally extending sides of said substantially flexible planar cord lock member so as to define along with said first aperture means a releasable locking means for lockingly engaging said cord extending through said first aperture means as a result of said longitudinally extending side edge portions of said second aperture means being disposed in a contracted state when said substantially flexible, planar cord lock member is disposed in a first, normal, non-compressed state, and for releasing said cord extending through said first aperture means as a result of said longitudinally extending side edge portions of said second aperture means being disposed in an expanded state wherein said longitudinally extending side edge portions of said second aperture means protrude outwardly from the plane of said substantially flexible, planar cord lock member in a predetermined selective direction, when said substantially flexible, planar cord lock member is disposed in a second compressed state as a result of being laterally compressed transversely with respect to said longitudinally extending sides thereof, so as to permit said cord to be selectively tightened or loosened.

15. The cord lock device as defined in claim 14 wherein second said aperture means has a substantially oval configuration.

16. The cord lock device as defined in claim 14, wherein:

said cord lock member includes a third aperture means defining therethrough and positioned proximate said first aperture means, and said second aperture means comprises a slit interconnecting said first and third aperture means, said slit and said first and third aperture means being formed such that axes thereof are disposed substantially perpendicular to the longitudinal axis of said cord lock member.

17. The cord lock device as defined in claim 14 including engagement means for increasing the engagement force and restriction of said cord through said first aperture means.

18. The cord lock device defined in claim 17 wherein said engagement means provide an increased engagement force to said cord only in one direction with respect to said first aperture means.

19. The cord lock device as defined in claim 17 wherein said engagement means are formed as a portion of said second end of said cord lock member about the perimeter of a fourth aperture means.

20. The cord lock device as defined in claim 14 including scoring means on said first end of said cord lock member for increasing the flexibility of said first end of said cord lock member proximate said first aperture means.

21. The cord lock device as defined in claim 14 including recess means along the length of and between said first and second ends of said cord lock member for increasing the flexibility of said cord lock member.

22. A one-piece cord lock for binding a drawstring of a garment, comprising:

a substantially flexible, planar cord lock member having a predetermined width, length, and thickness, first and second longitudinal ends, and longitudinally extending sides connecting said first and second longitudinal ends;

first aperture means defined within said substantially flexible, planar cord lock member for permitting a drawstring of a garment to extend therethrough; and second longitudinally extending aperture means connected to said first aperture means and including longitudinally extending side edge portions extending longitudinally between said longitudinally extending sides of said substantially flexible, planar cord lock member so as to define along with said first aperture means a releasable locking means for lockingly engaging said drawstring extending through said first aperture means as a result of said longitudinally extending side edge portions of said second aperture means being disposed in a contracted state when said substantially flexible, planar cord lock member is disposed in a first, normal, non-compressed state, and for releasing said drawstring extending through said first aperture means as a result of said longitudinally extending side edge portions of said second aperture means being disposed in an expanded state wherein said longitudinally extending side edge portions of said second aperture means protrude outwardly from the plane of said substantially flexible, planar cord lock member in a predetermined selective direction, when said substantially flexible, planar cord lock member is disposed in a second compressed state as a result of being laterally compressed transversely with respect to said longitudinally extending sides thereof, so as to permit said drawstring to be selectively tightened or loosened.

23. The cord lock as defined in claim 22 wherein the drawstring extends through an opening in the garment and is threaded through a hem in the garment, said garment opening being reinforced by a grommet so that upon pulling of the drawstring toward the garment said grommet cooperates with said opening in said cord lock member to increase the engagement force and restriction of the drawstring through said opening in said cord lock member in the direction of said drawstring pull.

24. The cord lock as defined in claim 22, wherein:

said first aperture means includes two axially spaced, substantially circular apertures interconnected by said second aperture means comprising a slit.

25. The cord lock as defined in claim 24 including means for connecting said second end of said cord lock member to the garment and engagement means proximate said second end of said cord lock member for cooperation with said two circular apertures and said slit upon pulling of the drawstring toward the garment and for increasing the engagement force and restriction of the drawstring through said two circular apertures and said slit in the direction of said drawstring pull.

* * * * *